Jan. 18, 1944.  E. E. HANSON  2,339,546
NONSTATIC TIRE
Filed Dec. 19, 1940  2 Sheets-Sheet 1

INVENTOR
Elmo E. Hanson

ATTORNEY

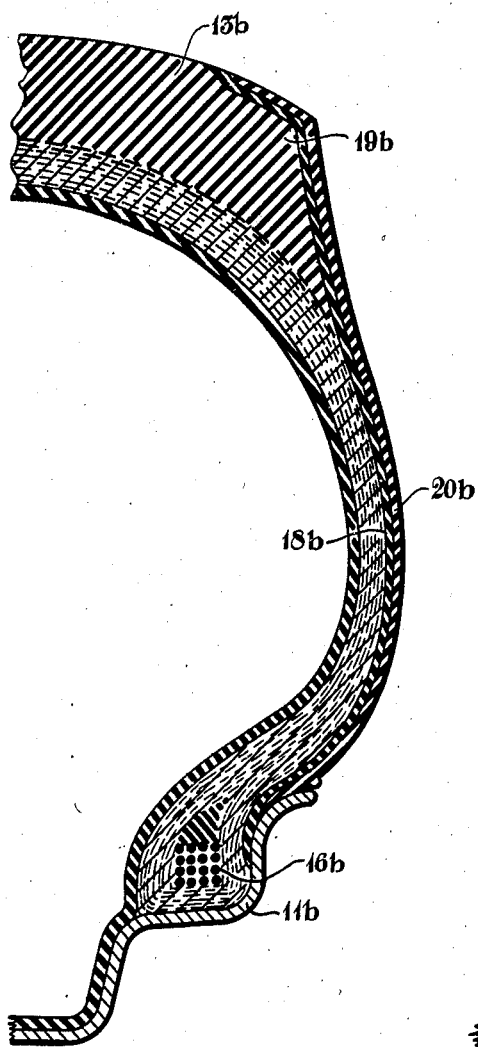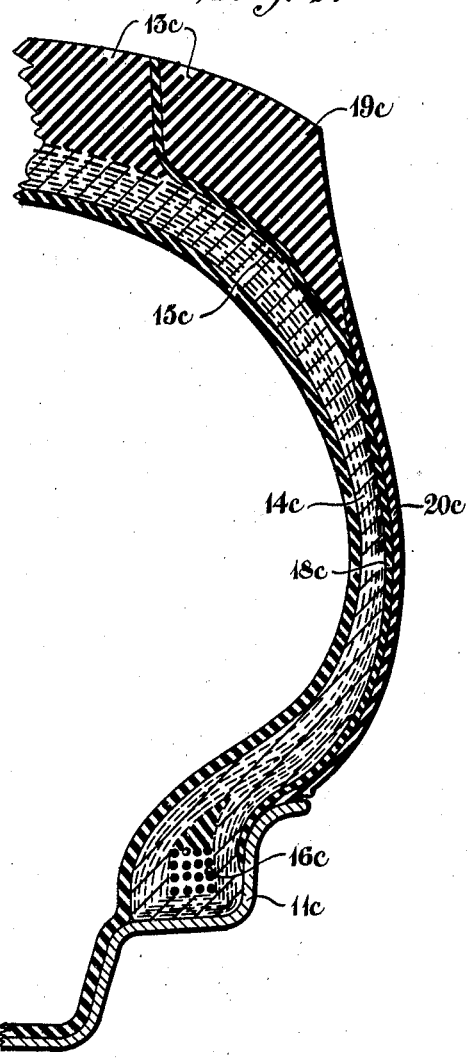

Patented Jan. 18, 1944

2,339,546

UNITED STATES PATENT OFFICE 2,339,546

NONSTATIC TIRE

Elmo E. Hanson, Akron, Ohio, assignor to The Firestone Tire & Rubber Company, Akron, Ohio, a corporation of Ohio Application December 19, 1940, Serial No. 370,739

5 Claims. (Cl. 152—151)

This invention relates to rubber tires and relates particularly to pneumatic tires made essentially of natural rubber or an equivalent.

The increasing popularity of automobile radios and the insistence on good radio reception on the part of users has created a new problem for tire manufacturers. Under many driving conditions it has been observed that radio reception in an automobile is seriously interfered with by a more or less constant discharge of static electricity due to the operation of the vehicle. It has been ascertained that during the operation of a pneumatic tire of the conventional type, a static electrical charge is often produced on the tire tread because of the friction between the tread and the road. The potential of this static charge depends on several factors, which include road conditions, tire tread design and the composition of the tread. A certain amount of this static charge leaks across the tire sidewall to the rim and then travels to the vehicle chassis and body. However, at any of the several places in the vehicle where a member is partially insulated such as by a film of grease or air, from a neighboring member, there exists, in effect, an electric condenser. Thus, during the course of the flow of the charge from the tire rim throughout the vehicle chassis and body, the charge potential often builds up at one of these effective condensers to the point at which a discharge occurs across the insulation to the neighboring member. It is this type of discharge which causes the radio interference peculiar to an automobile in operation.

A reduction in this static interference has sometimes been accomplished by the elimination of some of the effective condensers in the vehicle by the use of brushes or fixed electrical conductors. This procedure has rarely afforded complete relief from static and is often difficult to apply at all effectively, especially to a used vehicle. Changes in the tire tread design and the rubber compositions used in the tire have sometimes lessened the amount of radio interference in a given automobile but have not satisfactorily eliminated this undesirable property of conventional tires.

The need for a non-static tire is not limited to small passenger automobiles. More disagreeable and dangerous than radio interference is the shock sometimes experienced by a passenger boarding or alighting from a bus or by a service station attendant on first touching an automobile which has just stopped for service. The fire hazard brought about by the accumulation of a high static potential on certain trucks has long been recognized as substantial. This hazard has commonly been reduced on gasoline or oil trucks by the crude expedient of using a dragging chain to ground the truck chassis.

It is, therefore, an object of the present invention to provide a vehicle tire which is inherently incapable of producing a static electrical charge on a vehicle equipped with the tire.

Another object is to provide a tire which substantially prevents an electric shock to passengers alighting from a vehicle, or to persons standing on the ground and touching the vehicle.

Another object is to provide a tire which substantially eliminates any fire hazard attributable to the accumulation of an electric charge on a vehicle.

A further object is to provide a non-static tire which is not subject to unusual deterioration when in use.

The above and further objects will be manifest in the description of the invention presented hereinafter and in the accompanying drawings, in which:

Figure 3 is a fragmentary transverse section of a modified form of the invention; and Figure 4 is a fragmentary transverse section of a further modification of the invention.

Broadly, the invention consists in a rubber tire comprising a conducting element which extends from the face of the tire tread to a bead portion of the tire, the terminus of the element in the face of the tread being adapted to contact the road, and the terminus of the element in the bead portion being adapted to contact the tire rim. Thus, when the improved tire is operated on a vehicle, it provides an electrical contact between the surface of the road and the tire rim, and hence, the vehicle chassis. Preferably, the conducting element is positioned on one side of the tire and outside of the body portion thereof. In a preferred embodiment of the invention the conducting element consists of a conducting rubber composition, which may have a minimum conductance within the limits set out hereinafter. Such conducting element may comprise one or more strips of a conducting substance or may consist in a sidewall construction completely around one side of the tire.

Figure 1:
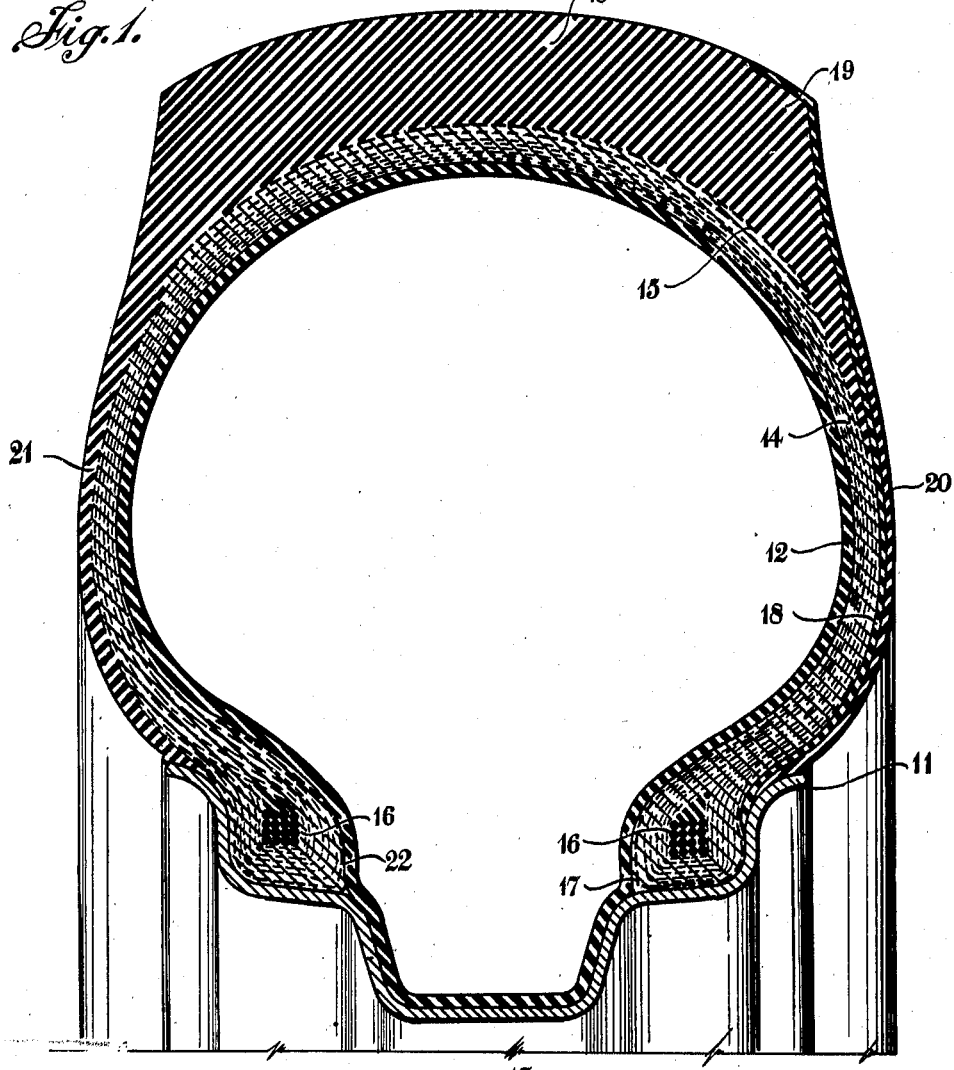
Figure 1 is a fragmentary transverse section of one embodiment of the invention.

Referring to the drawings, like reference numerals refer to like parts. In Figure 1 there is shown, in section, one form of the improved tire mounted on a conventional rim 11 and inflated by means of a conventional inner tube 12. The tire has a tread 13, body plies 14, extra tread plies 15 and beads 16. Positioned around one of the beads is a special chafer strip 17 containing an electrically conducting rubber composition. A portion of the chafer strip 17 is in contact with the inner surface of the rim 11 when the tire is inflated. An inner sidewall or conducting strip 18, consisting of a rubber composition, lies immediately over a portion of the chafer strip 17 on the bead side of the tire and may also touch the inner surface of the rim 11 when the tire is inflated, as shown. The conducting element 18 extends from contact with the chafer strip 17 along the outside of the body plies 14 to the tread portion 13. The conducting element therebeyond extends along the outer surface of the side portion of the tread 13 and around the tread shoulder 19 for a short distance on the road-engaging portion or face of the tread. An outer sidewall 20, of a conventional rubber composition, covers a portion of the element 18 so that none of the latter is exposed between the rim and a position on the side of the tire about opposite the nearer terminus of the extra tread plies 15.

On the opposite side of the tire there is shown the conventional structure with the usual sidewall 21 and chafer strip 22. Of course, both sides of the tire may have the novel construction employing the special conducting chafer strips and conducting elements if desired, but the use of such conducting means on only one side of the tire is generally sufficient for the purposes of the invention. Alternatively, the special chafer strip 17 may be replaced by a conventional chafer strip and the element 18 extended sufficiently around the bead to ensure contact thereof with the inner surface of the rim 11.

The purpose of the conducting element 18, with or without the special chafer strip 17, is to provide an electrical conducting path between the rim (and, hence, the vehicle chassis and body) and the road, during operation of the vehicle. This construction causes any static electrical charge to drain from the vehicle to the road substantially as rapidly as it forms, thereby maintaining the vehicle at substantially zero potential with respect to the road. Thus, there is no appreciable discharge of static electricity during the operation of the vehicle, and, consequently, no radio interference arising therefrom. Manifestly, all danger of static stock to passengers alighting or to other persons touching the vehicle is removed, and there is no longer any fire hazard due to an electric charge on the vehicle, since the employment of the improved tire thereon substantially completely prevents the building up of a static electric charge on the vehicle.

The use of only one of the improved tires may often be sufficient to eliminate completely any radio interference due to the operation of the vehicle or to preclude the possibility of a static shock to a passenger or other person. However, in certain extreme cases, such as the operation of a large bus at high speeds on a smooth, dry road of low conductivity, the use of two or more of the improved tires may be necessary for completely eliminating static from the vehicle, although the use of only one such tire substantially diminishes the maximum static potential occurring thereon.

In the tire shown in Figure 1, which is a preferred construction, the conducting element 18 is covered on the outside portion by a sidewall 20 of a conventional rubber composition. The sidewall 20 thereby prevents contact of the conducting sidewall or strip 18 with the air, from the rim portion to the base of the tread. The region of the tire in which the conducting element is so protected is the region wherein practically all sidewall flexing occurs during operation of the tire. Thereby the element, which is often more susceptible to flex-cracking than a conventional sidewall composition, is protected from the oxidizing outer air during the operation of the tire, and, hence, is prevented from deteriorating by flex-cracking.

Another feature of the preferred construction shown in Figure 1 is that the outer sidewall 20 protects the conducting element 18 from mechanical abrasion due to contact of the tire sidewall with curbs or stones on the road.

The element 18 is shown in Figure 1 extending around the tread shoulder 19 for a short distance along the road-engaging portion of the tread 13. When the shoulder 19 is broken by the tread design, it is advisable for the element 18 to extend far enough towards the center of the tread 13 so that at least the end of the element will make electrical contact with the road.

Figure 2:
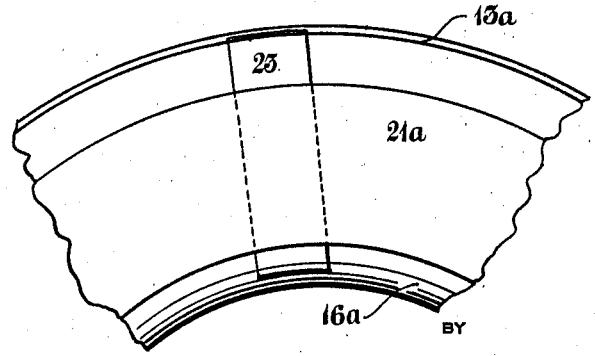
Figure 2 is a reduced fragmentary side elevation of another embodiment of the invention.

A portion of a modified improved tire is shown in side elevation in Figure 2. This tire has a conventional tread 13a, bead 16a and sidewall 21a. The modified tire has one (or more, e. g., four, evenly spaced apart) rubber conducting strip 23 electrically connecting the outer surface of the tire bead with the road-engaging tread surface, in a manner shown by the conducting element 18 in Figure 1 or in a modified manner hereinafter explained. Sidewall 21a covers at least the flexing portion of the strip 23, as is clearly shown in Figure 2. When the tire is mounted and inflated, the strip 23 may directly contact the inner surface of the tire rim or do so indirectly through a conducting chafer strip (not shown) similar to 17. The construction shown in Figure 2 is more suited to a smaller tire for use on a passenger automobile, or other vehicle, which does not require a means of high electrical conductance, such as a tire having a complete sidewall of conducting material, for grounding the vehicle.

Certain types of tires tend to crack radially in the vicinity of the tread shoulders. With such tires the construction shown in Figure 1 is oftentimes unsatisfactory in that the conducting element 18 may crack more readily in the vicinity of tread shoulder 19 than the usual tread stock. A modified construction, designed to overcome this tendency towards radial cracking is shown in Figure 3. The essential difference between this construction and that shown in Figure 1 is that the conducting element 18b extends all the way from the inner portion of the tire near the bead 16b to the road-engaging portion of the tread 13b, completely protected from outside air from the rim 11b to the road-engaging terminus of the element by means of an extended sidewall 20b. In other words, the outer sidewall 20b, of a conventional rubber composition to resist cracking, extends from beneath the rim 11b, around the tread shoulder 19b, to the place on the tread face 13b where the inner sidewall terminus is exposed. The construction shown in Figure 3 is applicable either in case a complete inner conducting sidewall is used or one or more conducting strips, as indicated in Figure 2, are used.

A further modified construction, designed to protect the conducting sidewall or strip from both sidewall flex-cracking and shoulder radial cracking, is shown in Figure 4. Therein, the conducting element 18c extends from contact with the rim 11c in the region of the bead 16c around the outer periphery of the body plies 14c, as in Figure 1. However, at the base of the tread 13c, the conducting element 18c continues around the periphery of the body plies 14c and extra tread plies 15c to a region more or less remote from the tread shoulder 19c and spaced nearer to the center of the tread, at which region the element 18c turns away from the tire body and extends outwardly to the face of the tread, at which region the terminus of the element 18c is exposed. The protecting sidewall 20c is entirely analogous in construction and purpose to the sidewall 20 shown in Figure 1.

A preferred method of making the improved tire when a conducting inner sidewall is desired comprises building up the body of the tire from plies and attaching the beads in the usual way, and then applying a chafer strip 17 around one of the beads. For the construction shown in Figure 1, the tread 13 is then placed around the body of the tire over the tread plies 15, and the conducting sidewall 18 is applied on one side of the tire over a portion of the chafer strip 17 and around the tread shoulder 19. The protecting sidewall 20 is laid around and over the inner sidewall 18 in the position shown in Figure 1, or, alternatively, sidewalls 18 and 20 may first be assembled as a laminated sidewall and applied to the tire as a unit. After the conventional chafer strip 22 and sidewall 21 have been added to the other side of the tire, the finished green tire is shaped to tire form (if it has been built on a drum) and thereafter vulcanized in a conventional mold.

The modified tire represented in Figure 2 is built in the same manner, except that one (or more) strip 23 of conducting rubber is substituted for the inner sidewall 18. Furthermore, the special chafer strip 17 may be replaced by a conventional chafer strip, care being taken that the conducting strip extends sufficiently around the bead portion of the tire to ensure contact of it with the inner surface of the wheel rim when the tire is in use.

The modified tire represented in Figure 3 may be built in the same way as the tire shown in Figure 1, the only change being that the outer sidewall 20b is wider than sidewall 20 and covers the conducting element 18b in the tread side and shoulder portions, as shown. When the tire is to embody a conducting sidewall, the use of a laminated sidewall consisting of sidewalls 18b and 20b is of especial advantage in this instance, in facilitating the tire-building operation.

It is advantageous to use a split tread, that is, a tread cut or extruded into two component strips, one wider than the other, in the manufacture of a tire according to the construction of Figure 4. The operations in this case are similar to those employed in building a tire according to Figure 1, except that the wider tread strip is applied to the tire body in a properly off-center fashion, and then the conducting element 18c is placed along the side of this tread portion nearer the center line of the tire tread and extended over the body plies and the chafer strip. Then, the narrower tread strip is placed on the tire so as to sandwich the terminus of the sidewall 18c nearer the center line of the tire tread between it and the other tread portion. Thereafter, the covering sidewall 20c is placed over the exposed side of the sidewall 18c, as is indicated in the figure, and the tire is completed as before.

The conducting sidewall or strip may be of any convenient thickness, depending on the type of tire in which it is used. Thicknesses of about 0.04 to 0.10 inch, depending on the tire size, have been found to be entirely satisfactory for the purposes of the invention.

The preferred conducting element consists of a rubber composition made conductive by the inclusion therein of a suitable conducting material which renders the vulcanized composition substantially more conductive than a conventional rubber composition. A preferred conducting material for use in the composition is a highly conductive carbon black, such as an acetylene black. A conventional tread composition, containing about 30 per cent of channel black, when vulcanized, has an electrical conductivity in the order of $1 \times 10^{-9}$ or $1 \times 10^{-10}$ mho per centimeter. If the channel black is completely replaced by a standard commercial grade of acetylene black, a composition is obtained which, when vulcanized, displays a conductivity in the order of $1 \times 10^{-4}$ mho per centimeter, an increase in conductivity of one hundred thousand-fold or greater. Compositions having intermediate conductivities may be made by replacing only part of the channel black with acetylene black, or by leaving out channel black and employing lower percentages than 30 of acetylene black. Stiffer compositions having higher conductivities than $1 \times 10^{-4}$ mho per centimeter may be made by using more than 30 per cent of the acetylene black, but these are not necessary in the present improved tire, nor usually so desirable from the standpoint of flexing properties of the composition.

The ordinary sidewall composition has a substantially lower conductivity than a conventional tread composition, so that the increase in conductivity of the tire sidewall by the use of a special conducting sidewall or strip according to the invention is often even greater than indicated by the above figures for conductivities. An electrically conducting rubber composition having a conductivity greater than $1 \times 10^{-8}$ mho per centimeter is suitable for use in the present invention. Preferably, but not necessarily, such composition should possess a conductivity of greater than $1 \times 10^{-6}$ mho per centimeter, in order for maximum protection from static to be secured.

It has been indicated hereinabove that the conducting composition may have poorer flexing properties than the conventional sidewall composition. Thus, when a tire is operated having an exposed sidewall of an acetylene black conducting rubber composition, the side wall may display considerable flex-cracking, resulting in lowered conductivity of the sidewall, a weakened tire structure and a marred appearance. However, when the flexing portions of the conducting element are covered by a conventional sidewall composition, according to the preferred constructions, no appreciable flex-cracking of the layer occurs, and it serves its purpose efficiently throughout the normal life of the tire.

It is now becoming common practice to incorporate certain antioxidants and/or waxes or other materials in a tire sidewall in order to reduce the sun-checking thereof. In the case of certain of these materials this practice has the disadvantage, with usual tire constructions, of causing more than the customary amount of static generation by the tire. By means of the present invention, a sidewall containing such special material may be used with entire satisfaction by the incorporation in the tire of an inner conducting element to prevent the accumulation of static charges on the vehicle.

The invention has been described in detail hereinabove in accordance with the patent laws, but the invention is not meant to be limited to the specific details disclosed. Modification may be resorted to and obvious equivalents substituted without departing from the spirit and scope of the invention as defined in the appended claims.

What is claimed is:

1. A pneumatic rubber tire having a tread portion, a body portion and a bead portion, said tire comprising a conducting element consisting of a conducting rubber composition, one terminus of which is positioned in the bead portion and is adapted to be in electrically conducting relation with a tire rim and the conducting element extending from said terminus over the outside of the body portion and around the adjacent tread shoulder to the other terminus of said element in the face of the tread portion and adapted to be in electrically conducting relation with a road surface, and a protective sidewall covering a portion of the outer surface of the conducting element and extending from a region near the bead terminus of the element to a region near the base of the tread.

2. A pneumatic rubber tire having a tread portion, a body portion and a bead portion, said tire comprising a conducting element consisting of a conducting rubber composition, one terminus of which is positioned in the bead portion and is adapted to be in electrically conducting relation with a tire rim and the conducting element extending from said terminus over the outside of the body portion and under the base of the tread in a direction towards the center of the base of the tread and then proceeding through the tread to expose the other terminus of said element in the face of the tread and adapted to be in electrically conducting relation with a road surface, a protecting sidewall covering a portion of the outer surface of the conducting element and extending from a region near the bead terminus of the element to a region nearer the shoulder of the tread than the position at which the conducting element extends under the base of the tread.

3. A rubber tire having a tread portion, a body portion and a bead portion, said tire comprising a conducting element consisting of a conducting rubber composition extending from the face of the tread portion over the outside of the body portion to the bead portion, the terminus of the conducting element positioned in the face of the tread portion adapted to be in electrically conducting relation with a road surface, the terminus of the conducting element positioned in the bead portion adapted to be in electrically conducting relation with a tire rim, and a protecting sidewall covering a portion of the outer surface of the conducting element and extending from a region near the bead terminus of the element to a region near the base of the tread portion of the tire.

4. A rubber tire having a tread portion, a body portion and a bead portion, said tire comprising a conducting element, consisting of a conducting rubber composition possessing a conductivity greater than $1 \times 10^{-6}$ mho per centimeter, extending from the face of the tread portion over the outside of the body portion to the bead portion, the terminus of the conducting element positioned in the face of the tread portion adapted to be in electrically conducting relation with a tire rim, and a protecting sidewall covering a portion of the outer surface of the conducting element and extending from a region near the bead terminus of the element to a region near the base of the tread portion of the tire.

5. A rubber tire having a tread portion, a body portion and a bead portion, said tire comprising a conducting element, consisting of a conducting rubber composition possessing a conductivity greater than $1 \times 10^{-6}$ mho per centimeter, extending from the face of the tread portion over the outside of the body portion to the bead portion, the terminus of the conducting element positioned in the face of the tread portion adapted to be in electrically conducting relation with a road surface, an electrically conducting chafer strip in the bead portion and in electrically conducting relation with said conducting element, said chafer strip being constructed and arranged to make electrical contact with a tire rim, and a protecting sidewall covering a portion of the outer surface of the conducting element and extending from a region near the bead terminus of the element to a region near the base of the tread portion of the tire.

ELMO E. HANSON.